US007747384B1

(12) United States Patent
Nadkarni et al.

(10) Patent No.: US 7,747,384 B1
(45) Date of Patent: Jun. 29, 2010

(54) METHOD FOR SUBSTITUTING AT LEAST ONE HIGH QUALITY POSITION MEASUREMENT TAKEN BEFORE AN INTERRUPTING EVENT WITH A SET OF UPGRADED LOW QUALITY POSITION MEASUREMENTS PROVIDED BY THE SAME SOURCE OF MEASUREMENTS AFTER THE INTERRUPTING EVENT

(75) Inventors: Vivek Bhalchandra Nadkarni, Sunnyvale, CA (US); Scott R. Smith, Scotts Valley, CA (US)

(73) Assignee: Trimble Navigation, Ltd., Sunnyvale, CA (US)

( * ) Notice: Subject to any disclaimer, the term of this patent is extended or adjusted under 35 U.S.C. 154(b) by 1264 days.

(21) Appl. No.: 11/133,798

(22) Filed: May 17, 2005

Related U.S. Application Data

(63) Continuation-in-part of application No. 10/857,099, filed on May 27, 2004, now Pat. No. 6,957,143, which is a continuation of application No. 10/165,712, filed on Jun. 6, 2002, now Pat. No. 6,810,324.

(51) Int. Cl.
*G01C 21/30* (2006.01)
(52) U.S. Cl. .............. 701/207; 701/200; 701/226; 342/357.02; 342/357.04; 342/357.15; 342/358
(58) Field of Classification Search ............ 701/200, 701/207–216, 224, 226; 342/352, 358, 357.01–357.15
See application file for complete search history.

(56) References Cited

U.S. PATENT DOCUMENTS

| 5,223,844 A * | 6/1993 | Mansell et al. ......... 342/357.07 |
| 5,534,875 A * | 7/1996 | Diefes et al. ........... 342/357.11 |
| 5,564,079 A * | 10/1996 | Olsson .................... 455/456.3 |
| 6,018,704 A * | 1/2000 | Kohli et al. ............... 702/149 |
| 6,480,145 B1 * | 11/2002 | Hasegawa .............. 342/357.06 |
| 6,633,814 B2 * | 10/2003 | Kohli et al. ................. 701/213 |
| 6,810,324 B1 * | 10/2004 | Nadkarni .................... 701/207 |
| 6,957,143 B1 * | 10/2005 | Nadkarni .................... 701/207 |
| 2003/0058163 A1 * | 3/2003 | Zimmerman et al. ... 342/357.08 |

* cited by examiner

*Primary Examiner*—Thomas G Black
*Assistant Examiner*—Wae Louie
(74) *Attorney, Agent, or Firm*—Boris G. Tankhilevich

(57) ABSTRACT

A method for substituting at least one high quality position measurement of an object taken before an interrupting event with a set of upgraded low quality position measurements of the object provided by the same source of measurements after the interrupting event. The method comprises the following steps: (A) obtaining at least one high quality position measurement of the object provided by a source of measurements before the interrupting event; (B) saving at least one high quality position measurement of the object; (C) if at least one position measurement of the object provided by source of measurements after the interrupting event is of substantially high quality, using at least one position measurement of substantially high quality of the object for navigation purposes of the object; and (D) if each position measurement of the object provided by the source of measurements after the interrupting event is of low quality, and if there is not at least one restoration event; then upgrading at least one position measurement of the object by using an upgrade algorithm.

7 Claims, 3 Drawing Sheets

METHOD FOR SUBSTITUTING AT LEAST ONE HIGH QUALITY POSITION MEASUREMENT TAKEN BEFORE AN INTERRUPTING EVENT WITH A SET OF UPGRADED LOW QUALITY POSITION MEASUREMENTS PROVIDED BY THE SAME SOURCE OF MEASUREMENTS AFTER THE INTERRUPTING EVENT

This is a continuation-in-part of the application Ser. No. 10/857,099, filed on May 27, 2004, now U.S. Pat. No. 6,957,143 and entitled "MONITORING OF SUBSTITUTION OF HIGH QUALITY POSITION MEASUREMENTS WITH UPGRADED LOW QUALITY POSITION MEASUREMENTS", which is the continuation of the application Ser. No. 10/165,712, filed on Jun. 6, 2002, and entitled "SUBSTITUTION OF HIGH QUALITY POSITION MEASUREMENTS WITH UPGRADED LOW QUALITY POSITION MEASUREMENTS", which is now the U.S. Pat. No. 6,810,324.

BACKGROUND OF THE INVENTION

1. Field of the Invention

The present invention is in the field of position measurements, and more specifically, is in the field of improving the quality of position measurements.

2. Discussion of the Prior Art

In the prior art, there are several methods of improving quality of position measurements by performing the operations of filtering and/or smoothing of obtained position measurements. The prior art also discusses different ways of improving measurements by performing sensor fusion, that is by combining a number of measurements performed by a plurality of sensors in order to obtain a higher quality position measurement as compared with a position measurement obtained by a single sensor. For instance, the well known in the art Kalman filter significantly increases the accuracy of Global Position System (GPS) position measurements by combining Global Position System (GPS) measurements and the Inertial Navigation System (INS) measurements.

However, the prior art methods of improving the quality of position measurements do not teach how to improve the quality of position measurements of an object in a situation when a previously available source of high quality position measurements significantly degrades and becomes a source of low quality position measurements after an interrupting event have occurred.

SUMMARY OF THE INVENTION

To address the shortcomings of the available art, the present invention provides a method for substituting at least one high quality position measurement taken before an interrupting event with a set of upgraded low quality position measurements provided by the same source of measurements after the interrupting event.

One aspect of the present invention is directed to a method for substituting at least one high quality position measurement of an object taken before an interrupting event with a set of upgraded low quality position measurements of the object provided by the same source of measurements after the interrupting event.

In one embodiment of the present invention, the method comprises the following steps: (A) obtaining at least one high quality position measurement of the object provided by a source of measurements before the interrupting event; (B) saving at least one high quality position measurement of the object; (C) if at least one position measurement of the object provided by the source of measurements after the interrupting event is of substantially high quality; or if each position measurement of the object provided by the source of measurements after the interrupting event is of low quality, and if there is a restoration event, and if at least one position measurement of the object provided by the source of measurements after the restoration event is of substantially high quality; then using at least one position measurement of substantially high quality of the object for navigation purposes of the object; and (D) if each position measurement of the object provided by the source of measurements after the interrupting event is of low quality, and if there is not at least one restoration event; then upgrading at least one position measurement of the object by using an upgrade algorithm; or, if each position measurement of the object provided by the source of measurements after the interrupting event is of low quality, and if there is a restoration event, and if each position measurement of the object provided by the source of measurements after the restoration event is of low quality; then upgrading at least one position measurement of the object by using the upgrade algorithm. In this embodiment of the present invention, each low quality position measurement of the object includes an epoch timing coordinate indicative of when such low quality position measurement of the object was taken. In this embodiment of the present invention, at least one position measurement of the object is of low quality if the low quality position measurement of the object includes an unacceptable error in the position measurement of the object, or is not substantially recent.

In one embodiment of the present invention, the step (A) of obtaining at least one high quality position measurement of the object provided by the source of measurements before the interrupting event further comprises the following steps: (A1) selecting the source of position measurements from the group consisting of: {a carrier differential Satellite Positioning System (SATPS); a code differential SATPS; an autonomous SATPS; an Inertial Navigation System (INS); and a Pseudolite-Based Positioning System}; and (A2) obtaining at least one high quality position measurement of the object by using a selected source of position measurements. In this embodiment of the present invention, each high quality position measurement of the object includes an epoch timing coordinate indicative of when the high quality position measurement of the object was taken. In this embodiment of the present invention, the high quality position measurement of the object is of substantially high quality if it includes an acceptable error and is substantially recent. In this embodiment of the present invention, a position measurement of the object is of substantially high quality if the position measurement of the object satisfies a threshold of acceptability requirement for the object. In this embodiment of the present invention, the threshold of acceptability is defined as a bound between an acceptable error in a position measurement of the object and an unacceptable error in the position measurement of the object. In this embodiment of the present invention, a position measurement is substantially recent if a rate of updating the position measurement is substantially sufficient to obtain a substantially accurate position measurement of the object.

In one embodiment of the present invention, the step (C) further comprises the step (C1) of detecting the interrupting event. In one embodiment of the present invention, the interrupting event is selected from the group consisting of: {an event leading to an unacceptable error in the position measurement of the object; and an event causing at least one position measurement of the object to be not substantially recent}.

In one embodiment of the present invention, the step (C) further comprises the step (C2) of detecting the restoration event. In one embodiment of the present invention, the restoration event is selected from the group consisting of: {an event leading to an acceptable error in the position measurement of the object; and an event causing at least one position measurement of the object to be substantially recent}.

In one embodiment of the present invention, the step (C) further comprises the following steps: the step (C3) of periodically checking whether at least one substantially high quality position measurement of the object is available and is substantially recent; and the step (C4) of using at least one position measurement of substantially high quality of the object for navigation purposes if at least one substantially high quality position measurement of the object is available and is substantially recent.

In one embodiment of the present invention, the step (C) further comprises the step (C5) of setting a position measurement threshold of acceptability for the object. In another embodiment of the present invention, the step (C) further comprises the step (C6) of setting a predetermined position measurement threshold of acceptability for the object. In one more embodiment of the present invention, the step (C) further comprises the step (C7) of setting a dynamically variable position measurement threshold of acceptability for the object.

In one embodiment of the present invention, the step (C5) of setting the position measurement threshold of acceptability for the object further comprises the step (C5, 1) of setting the position measurement threshold of acceptability for the object to be a standard deviation of a set of position measurement errors taken over a statistically significant time period. In another embodiment of the present invention, the step (C5) of setting the position measurement threshold of acceptability for the object further comprises the step (C5, 2) of setting the position measurement threshold of acceptability for the object to be a maximum measurement error that is acceptable for a given navigation application of the object. In one more embodiment of the present invention, the step (C5) of setting the position measurement threshold of acceptability for the object further comprises the step (C5, 3) of determining the maximum measurement error that is acceptable for the given navigation application of the object. Yet in an additional embodiment of the present invention, the step (C5) of setting the position measurement threshold of acceptability for the object further comprises the step (C5, 4) of determining a largest measurement error that is less then the threshold of acceptability for the object, and setting the maximum measurement error to be equal to the largest measurement error that is still less then the threshold of acceptability for the object.

In one embodiment of the present invention, the step (D) of upgrading at least one position measurement of the object by using the upgrade algorithm further comprises the following steps: (D1) if a set of Correction Terms is substantially unavailable, computing the set of Correction Terms; wherein the set of Correction Terms comprises a set of error estimates of at least one low quality position measurement; (D2) if the set of Correction Terms is substantially available, computing at least one system quality metric; wherein the system quality metric indicates whether or not the set of Correction Terms is substantially adequate for upgrading purposes; (D3) if each system quality metric indicates that the set of Correction Terms is substantially adequate for upgrading purposes, setting a flag indicating that the set of Correction Terms is substantially adequate for upgrading purposes, using the set of Correction Terms to upgrade at least one low quality position measurement of the object to obtain at least one upgraded position measurement of the object, and outputting at least one upgraded position measurement of the object; (D4) if at least one system quality metric indicates that the set of Correction Terms is substantially inadequate for upgrading purposes, setting a flag indicating that the set of Correction Terms is substantially inadequate for upgrading purposes, and checking whether the set of Correction Terms can be updated to become substantially adequate for upgrading purposes; (D5) if the set of Correction Terms is updatable to become substantially adequate for upgrading purposes, updating the set of Correction Terms, using the set of updated Correction Terms to upgrade at least one low quality position measurement of the object in order to obtain at least one upgraded position measurement of the object, and outputting at least one upgraded position measurement of the object; and (D6) preferably repeating steps ((D1)-(D5)) for each next epoch of position measurement of the object.

In one embodiment of the present invention, the step (D) of upgrading at least one position measurement of the object by using the upgrade algorithm further comprises the step (D7) of monitoring errors in the upgraded position measurement of the object.

Another aspect of the present invention is directed to an apparatus for substituting at least one high quality position measurement of an object taken before an interrupting event with a set of upgraded low quality position measurements of the object provided by the same source of measurements after the interrupting event.

In one embodiment of the present invention, the apparatus comprises: (A) a means for obtaining at least one high quality position measurement of the object provided by a source of measurements before an interrupting event; (B) a means for saving at least one high quality position measurement of the object; (C) a means for detecting an interrupting event; (D) a means for detecting a restoration event; and (E) a means for upgrading at least one position measurement of the object.

In one embodiment of the present invention, the means (A) for obtaining at least one high quality position measurement of the object further comprises a source of position measurement selected from the group consisting of: {a carrier differential SATPS; a code differential SATPS; an autonomous SATPS; an Inertial Navigation System (INS); and a Pseudolite-Based Positioning System}.

In one embodiment of the present invention, the means (B) for saving at least one high quality position measurement of the object further comprises a memory block.

In one embodiment of the present invention, the means (C) further comprises a means for detecting the interrupting event selected from the group consisting of: {an event leading to an unacceptable error in the position measurement of the object; and an event causing at least one high quality position measurement of the object to be not substantially recent}.

In one embodiment of the present invention, the means (C) for detecting an interrupting event further comprises: a CPU configured to compute a satellite tracking list; a First Memory Block configured to store a satellite tracking list computed at a prior epoch; and a Second Memory Block configured to store a satellite tracking list computed at a current epoch. In this embodiment of the present invention, the CPU is configured to compare the contents of the First Memory Block and the Second Memory Block. If these contents are not identical, then the satellite tracking list has changed from the previous epoch and this change in the satellite tracking list constitutes an interrupting event.

In one embodiment of the present invention, the means (D) further comprises a means for detecting a restoration event selected from the group consisting of: {an event leading to an acceptable error in the position measurement of the object; and an event causing at least one high quality position measurement of the object to be substantially recent}.

In one embodiment of the present invention, the means (D) for detecting a restoration event further comprises: a CPU configured to compute a satellite tracking list; a First Memory Block configured to store a satellite tracking list computed before an interrupting event; and a Second Memory Block configured to store a satellite tracking list computed at a current epoch. In this embodiment of the present invention, the CPU is configured to compare the contents of the First Memory Block and the Second Memory Block. If these contents are identical, then the satellite tracking list has changed to match the satellite tracking list computed before the interrupting event, and such match constitutes a restoration event.

In one embodiment of the present invention, the means (E) for upgrading at least one position measurement of the object further comprises an upgrade algorithm.

In one embodiment of the present invention, the means (E) for upgrading at least one position measurement of the object further comprises an upgrade algorithm comprising at least the following steps: (E1) if a set of Correction Terms is substantially unavailable, computing the set of Correction Terms; wherein the set of Correction Terms comprises a set of error estimates of at least one low quality position measurement; (E2) if the set of Correction Terms is substantially available, computing at least one system quality metric; wherein each the system quality metric indicates whether or not the set of Correction Terms is substantially adequate for upgrading purposes; (E3) if each system quality metric indicates that the set of Correction Terms is substantially adequate for upgrading purposes, setting a flag indicating the set of Correction Terms is substantially adequate for upgrading purposes, using the set of Correction Terms to upgrade at least one low quality position measurement of the object in order to obtain at least one upgraded position measurement of the object, and outputting at least one upgraded position measurement of the object; (E4) if at least one system quality metric indicates that the set of Correction Terms is substantially inadequate for upgrading purposes, setting a flag indicating the set of Correction Terms is substantially inadequate for upgrading purposes, and checking whether the set of Correction Terms can be updated to become substantially adequate for upgrading purposes; (E5) if the set of Correction Terms is updatable to become substantially adequate for upgrading purposes; updating the set of Correction Terms, using the set of updated Correction Terms to upgrade at least one low quality position measurement of the object to obtain at least one upgraded position measurement of the object, and outputting at least one upgraded position measurement of the object; and (E6) preferably repeating the steps ((E1)-(E5)) for each next epoch of position measurement of the object.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
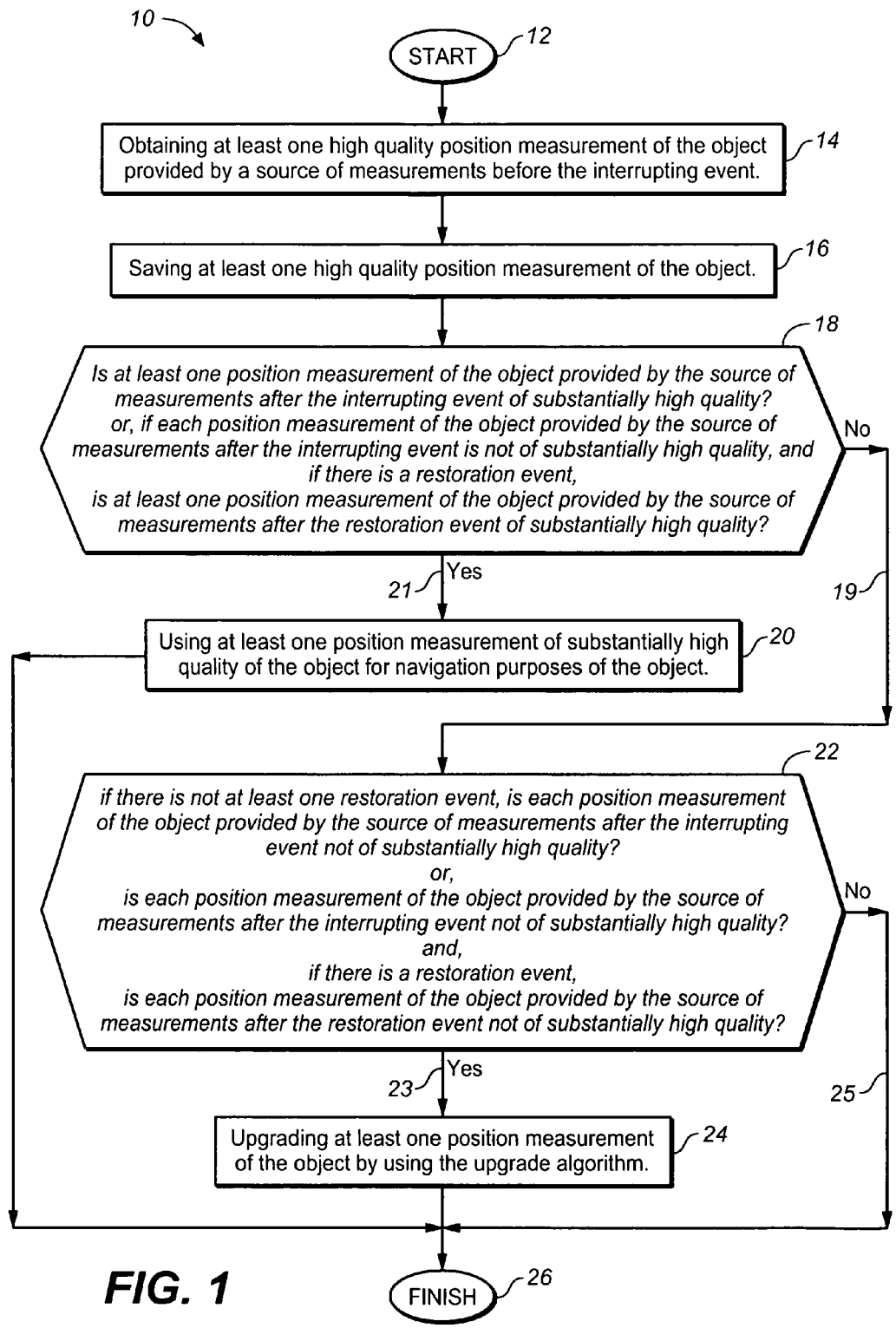
FIG. 1 depicts a flow chart of the method of the present invention for substituting at least one high quality position measurement taken before an interrupting event with a set of upgraded low quality position measurements provided by the same source of measurements after the interrupting event.

In one embodiment, FIG. 1 depicts a flow chart 10 of the method of the present invention. The first step 14 is configured to obtain at least one high quality position measurement of the object provided by a source of measurements before the interrupting event.

In one embodiment of the present invention, the source of measurements before the interrupting event is selected from the group consisting of: {a carrier differential SATPS; a code differential SATPS; an autonomous SATPS; an Inertial Navigation System (INS); and a Pseudolite-Based Positioning System}.

In one embodiment of the present invention, the source of measurements after the interrupting event is selected from the same group consisting of: {a carrier differential SATPS; a code differential SATPS; an autonomous SATPS; an Inertial Navigation System (INS); and a Pseudolite-Based Positioning System}.

Example I

The Autonomous Satellite Positioning System includes a Satellite Positioning System—SATPS (GPS, Glonass, GNSS, GALILEO, etc.), or a Terrestrial Radio Positioning or Navigation System (e.g. Loran, VOR/DME). The Autonomous Satellite Positioning System utilizes an Autonomous SATPS receiver—a position measurement device that measures the time it takes for signals to travel to it from each of several satellites. The time measurement is made by locking onto a code that the satellites send out at a carrier frequency, at a known time. The Autonomous SATPS receiver triangulates its own position by using the measured travel times of the signal from each satellite.

Example II

A Pseudolite-Based Positioning System includes a plurality of pseudolite transmitters positioned in known locations and a pseudolite receiver—a position measurement device that measures the time it takes for signals to travel to it from each of several pseudolite transmitters. The pseudolite receiver triangulates its own position by using the measured travel times of the signal from each pseudolite transmitter.

Example III

The Code Differential Satellite Positioning System includes a Differential GPS, or a differential Glonass, or a WAAS DGPS, or a differential GNSS etc. The Code Differential Satellite Positioning System uses a Code Differential SATPS receiver. The Code Differential SATPS receiver comprises a mobile Autonomous SATPS receiver, called the rover, and a stationary Autonomous SATPS receiver placed at a known reference position. The Code Differential SATPS receiver compares the position measurements calculated by the rover Autonomous SATPS receiver with the position measurements calculated by the stationary Autonomous SATPS receiver at a known reference position. Errors that are common to both receivers can be removed in this manner.

Example IV

The Carrier Differential SATPS uses a Carrier Differential SATPS receiver. The Carrier Differential SATPS receiver is similar to a code differential SATPS receiver. In the carrier differential SATPS, the rover receiver compares the phase of the carrier frequency of the signal sent to it from each satellite, with the phase measured at a second reference receiver at a known position. This is in addition to locking onto the code that the satellites sent out, as Autonomous SATPS receivers do. Errors that are common to both receivers can be removed with this method. The Carrier differential SATPS provides a higher accuracy position measurement than the code differential SATPS.

Example V

The Inertial Navigation System (INS) comprises a processor and sensors that measure linear acceleration (accelerometers) and/or sensors that measure rotational rate (gyroscopes). The outputs of these sensors of the INS are integrated by the processor to provide a position measurement as well as an attitude (orientation) measurement. The accuracy of the INS is characterized by the accuracy of its accelerometers and gyroscopes. The High Accuracy Inertial Navigation System (HAINS) uses high accuracy gyroscopes and accelerometers, whereas the Low Accuracy Inertial Navigation System (LAINS) utilizes low accuracy gyroscopes and accelerometers. High accuracy gyroscopes have a low drift and low noise in the measured angular rate, whereas low accuracy gyroscopes have a high drift and high noise in the measured angular rate. Similarly, high accuracy accelerometers have a low drift and low noise in the measured acceleration, and low accuracy accelerometers have a high drift and high noise in the measured acceleration. The Inertial Navigation System (INS) is usually used in a Kalman Filter (or other positioning filter) in combination with any other position measurement source, like Carrier Differential SATPS, Code Differential SATPS, or Autonomous SATPS.

Referring still to FIG. 1, in one embodiment of the present invention, each low quality position measurement of the object includes an epoch timing coordinate indicative of when such low quality position measurement of the object was taken. Similarly, in this embodiment of the present invention, each high quality position measurement of the object includes an epoch timing coordinate indicative of when the high quality position measurement of the object was taken. Therefore, it allows one to determine whether the particular measurement is substantially recent. More specifically, in this embodiment of the present invention, a position measurement is substantially recent if a rate of updating the position measurement is substantially sufficient to obtain a substantially accurate position measurement of the object.

Referring still to FIG. 1, in one embodiment of the present invention, a high quality position measurement of the object is of substantially high quality if it includes an acceptable error and is substantially recent. Similarly, a position measurement of the object is of low quality if it includes an unacceptable error in the position measurement of the object, or is not substantially recent.

In one embodiment of the present invention, a position measurement of the object is of substantially high quality if the position measurement of the object satisfies a threshold of acceptability requirement for the object. In this embodiment of the present invention, the threshold of acceptability is defined as a bound between an acceptable error in a position measurement of the object and an unacceptable error in the position measurement of the object.

Thus, a high quality position measurement has an error that is lower than the threshold of acceptability. On the other hand, a position measurement that is of low quality includes an error that is higher than the threshold of acceptability.

In one embodiment of the present invention, a position measurement threshold of acceptability for the object is preselected. More specifically, in one embodiment of the present invention, a predetermined position measurement threshold of acceptability for the object is pre-set.

Example VI

The position measurement threshold of acceptability for the object is set to be a standard deviation of a set of position measurement errors taken over a statistically significant time period.

Example VII

The position measurement threshold of acceptability for the object is set to be a maximum measurement error that is acceptable for a given navigation application of the object.

Example VIII

The position measurement threshold of acceptability for the object is set to be a largest measurement error that is less then the threshold of acceptability for the object.

Example IX

The position measurement threshold of acceptability for the object is selected to be a dynamically variable position measurement threshold of acceptability for the object.

Referring still to FIG. 1, in one embodiment of the present invention, the step 14 is dependent on the happening (or non-happening) of an interrupting event. In one embodiment of the present invention, the interrupting event is selected from the group consisting of: {an event leading to an unacceptable error in the position measurement of the object; and an event causing at least one position measurement of the object to be not substantially recent}.

Example X

Example of Interrupting Events

Data from GNSS satellites. Monitor changes in the Issue of Data Ephemeris (IODE) parameter from each GPS satellite. A change in IODE indicates the occurrence of the interrupting event. It also indicates that the Correction Terms should be updated at this epoch.

Example XI

Example of Interrupting Events

Monitor the number of satellites being used in the GPS position solution. A change in the number of satellites being used in the position solution is an interrupting event.

Example XII

Example of Interrupting Events

Statements 3 through 8 from the parent patent (U.S. Pat. No. 6,810,324) are examples of interrupting events.

The time elapsed since an update to the correction terms was made is higher than some threshold. Statement 3

The DOP of the low quality GPS measurement changed from the previous epoch. Statement 4

The satellite constellation used by the low quality GPS measurement changed from the previous epoch. Statement 5

The position measured in the current epoch differs from the position measured in the previous epoch by an amount greater than some threshold. Statement 6

The statement 6 can be extended to look at epoch to epoch differences of velocity, acceleration and any higher order terms being considered, and see if any of these are greater than an absolute threshold. Statement 7

The mismatch between the change in position from the prior epoch, and the expected change in position based on measured velocity is greater than some threshold. Statement 8

Referring still to FIG. 1, in one embodiment of the present invention, the next step 16 in the flow chart 10 is the step of saving at least one high quality position measurement of the object. The test condition 18 sets the following test:

Is at least one position measurement of the object provided by the source of measurements after the interrupting event is of substantially high quality?

or, if each position measurement of the object provided by the source of measurements after the interrupting event is not of substantially quality, and if there a restoration event, is at least one position measurement of the object provided by the source of measurements after the restoration event of substantially high quality?

In one embodiment of the present invention, the test condition 18 is dependent on the happening (or non-happening) of a restoration event. In one embodiment of the present invention, the restoration event is selected from the group consisting of: {an event leading to an acceptable error in the position measurement of the object; and an event causing at least one position measurement of the object to be substantially recent}.

Example XIII

Example of Restoration Event

The satellite tracking list computed before an interrupting event occurred is matched to a satellite tracking list computed at a current epoch. Such match constitutes a restoration event.

Referring still to FIG. 1, in one embodiment of the present invention, if the test condition 18 is satisfied (logical arrow 21 YES), then at least one position measurement of substantially high quality of the object can be used for navigation purposes of the object (step 20). The position measurement of substantially high quality of the object includes: {positions, velocities, statistics on position and velocity measurements etc.}. This is the typical information given by the standard GPS receiver. All statistics may not exist in all GPS receivers and/or in INS. One would preferably use all the available statistics because the more statistics are used the better the algorithm performs.

As long as the obtained position measurements have higher quality than threshold of acceptability, the obtained position measurements can be used for navigation of the object. However, the high quality measurements are not always available, or are not always substantially recent. If this is the case, one can still perform a periodic checking operation (not shown) to detect whether at least one high quality position measurement of the object is available and is substantially recent, so it can be used for navigation of the object.

However, if none of high quality position measurement of the object is available and is substantially recent, referring still to FIG. 1, the test condition 18 fails, that is the next step of the method of the present invention follows the logical arrow 19. If this is the case, the flow chart 10 includes the next test condition 22:

if there is not at least one restoration event, is each position measurement of the object provided by the source of measurements after the interrupting event not of substantially high quality?

or, is each position measurement of the object provided by the source of measurements after the interrupting event of not of substantially high quality?

and, if there is a restoration event, is each position measurement of the object provided by the source of measurements after the restoration event of not of substantially high quality?

If the test condition 22 is satisfied (logical arrow 23 YES), then at least one position measurement of the object can be upgraded by using the upgrade algorithm (step 24).

Figure 2:
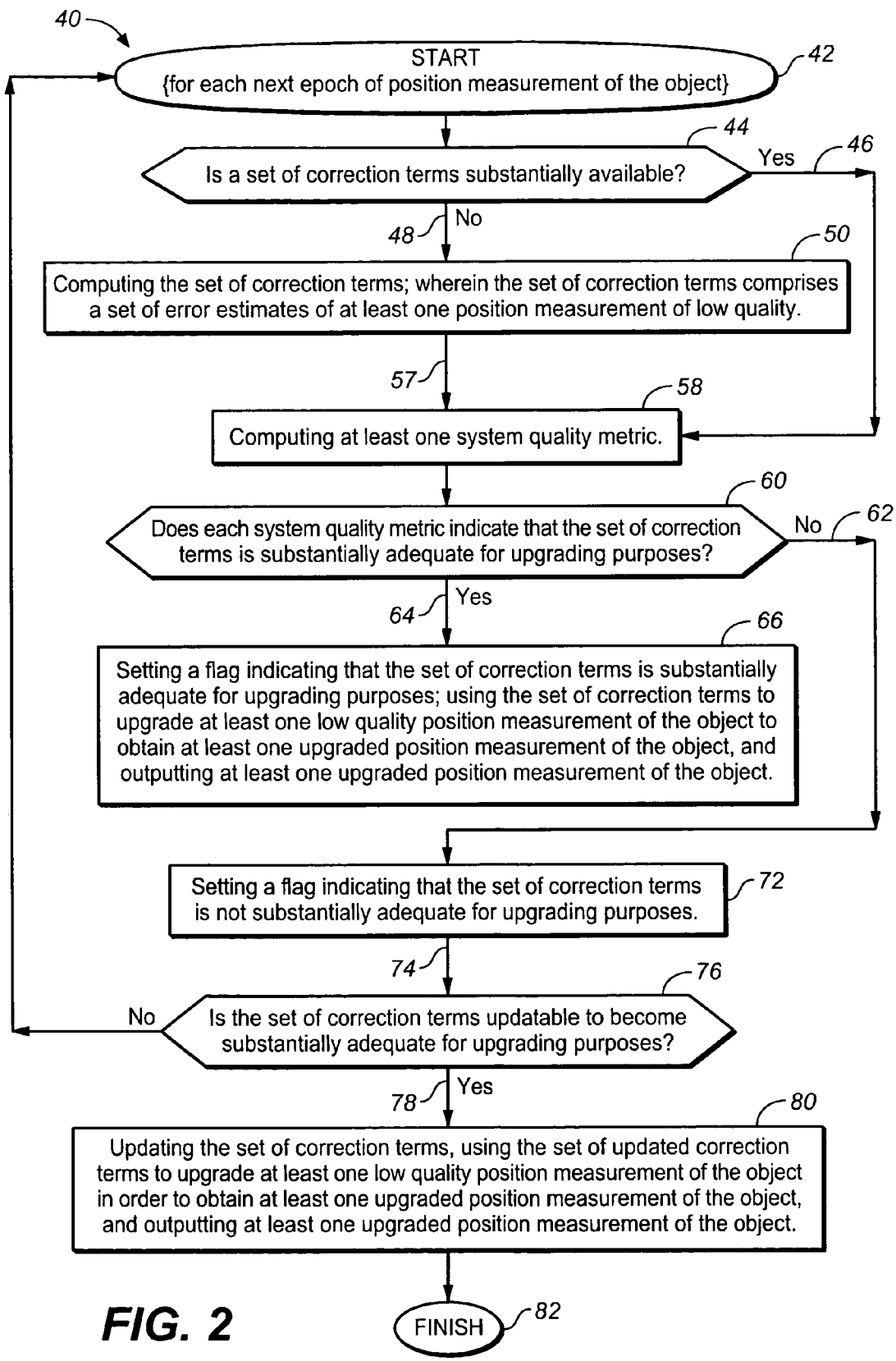
FIG. 2 is the flow chart that illustrates the upgrade algorithm of the present invention.

In one embodiment of the present invention, the step (D) of upgrading at least one position measurement of the object is implemented by using the upgrade algorithm illustrated in the flow chart 40 of FIG. 2.

Example XIV

The following is a (non-exhaustive) list of possible inputs to an upgrade algorithm, as well as inputs to update the Correction Terms.

(A) measurements from inertial sensors such as gyroscopes and accelerometers;

(B) steering angle measurements;

(C) measurements of vehicle velocity from speed sensors;

(D) estimates of vehicle velocity, acceleration, jerk, yank, and higher order dynamics from GPS or other sensors;

(E) estimates of cross track error of a vehicle (usually derived from the above measurements);

(F) GNSS constellation;

(G) data messages from GNSS (Global Navigation Satellite System) satellites;

(H) data messages from SBAS (Satellite Based Augmentation System) satellites.

The following models can be used as components of an upgrade algorithm, or to process the inputs before sending them to the upgrade algorithm: a vehicle dynamic model; a vehicle kinematic model; and an inertial navigation model.

Referring still to FIG. 2, the first test condition 44 checks if a set of Correction Terms is substantially available. Indeed, the set of Correction Terms is typically cleared from memory block (not shown) or is set to zero. Thus, if the set of Correction Terms is unavailable (Logical Arrow 48), it needs to be computed (step 50 of FIG. 2).

The set of Correction Terms comprises a set of error estimates of at least one low quality position measurement. They are to be subtracted from the low quality position measurements in order to upgrade the low quality position measurements.

There are various methods of computing the Correction Terms.

Example XV

Computation of Correction Terms by Using a Speed Sensor and Steering Angle Sensor as Inputs to a Vehicle Kinematic Model, to Predict the Position of the Vehicle at the Measurement Epoch of the Low Quality Position More specifically:

predicted position[$n$]=Kinematic Position Model
(speed, steering angle, $n$, $xh[n-1]$, $vh[n-1]$)

predicted velocity[$n$]=Kinematic Velocity Model
(speed, steering angle, $n$, $xh[n-1]$, $vh[n-1]$)

Then $bp[n]=xl[n]$-predicted position[$n$]

$bv[n]=xl[n]$-predicted velocity[$n$]

Example XVI

Computation of Correction Terms by Using Inertial Sensors—Gyros and Accelerometers—Arranged Orthogonally, to Predict the Position of the Vehicle at the Measurement Epoch of the Low Quality Position More specifically:

predicted position[$n$]=Inertial Position Model(accelerometer measurements, gyroscope measurements, epoch($n$), $xh[n-1]$, $vh[n-1]$)

predicted velocity[$n$]=Inertial Velocity Model(accelerometer measurements, gyroscope measurements, epoch($n$), $xh[n-1]$, $vh[n-1]$)

Then $bp[n]=xl[n]$-predicted position[$n$]

$bv[n]=xl[n]$-predicted velocity[$n$]

Example XVII

Computation of Correction Terms Using a Single Epoch $bp[n]=xl[n]-xh[n]$ $bv[n]=vl[n]-vh[n]$

Example XVIII

Computation of Correction Terms Using Two Different Epochs $bv[n]=vl[n]-vh[n-1]$ $bp[n]=xl[n]-(xh[n-1]+vh[n-1]*dt[n])$

Example XIX

Computation of Correction Terms by Filtering Correction Terms from Several Epochs Compute bp_raw[n] and bv_raw[n] using the method from Example 1 for several epochs, n, n−1, n−2, . . . n−m.

Also, store the computed filtered Correction Terms from the prior k epochs. Then, compute the Correction Terms as a linear combination of the previous Correction Terms:

$bp[n]=a[0]*bp\_raw[n]+a[1]*bp\_raw[n-1]+Y+a[m]$
$*bp\_raw[n-m]+b[1]*bp[n-1]+b[2]*bp[n-2]+..$
$. +b[k]*bp[n-k]$ $bv[n]=c[0]*bv\_raw[n]+c[1]*bv\_raw[n-1]+ ...$
$+c[m]*bv\_raw[n-m]+d[1]*bv[n-1]+d[2]*bv[n-$
$2]+ ... +d[k]*bv[n-k];$ where a[i], b[i], c[i], d[i] are filter coefficients.

Example XX

Extension to Mismatched Measurement Epochs

These examples are also extendable to include situations in which the high quality measurements and the low quality measurements are performed at different times, with different periods. Example XVIII is a simple case in which the period of measurement is the same, but the time at which the measurements were taken is different. Such cases make the math more complicated, but the fundamental ideas remain the same.

Example XXI

Higher Order Extensions

The given above examples describe measurements and the corresponding Correction Terms of position and velocity. That is they describe position and the $1^{st}$ derivative of position. If the measurements include the higher order derivatives of position such as acceleration ($2^{nd}$ derivative), jerk ($3^{rd}$ derivative), yank (4$^{th}$ derivative), etc., then the corresponding Correction Terms are added to the correction equations.

Herein:

xh[n]=high quality position at epoch n;

xl[n]=low quality position at epoch n;

vh[n]=high quality velocity at epoch n;

vl[n]=low quality velocity at epoch n;

bp[n]=position bias of low quality position at epoch n (position Correction Terms at epoch n);

bv[n]=velocity bias of low quality position at epoch n (velocity Correction Terms at epoch n);

t[n]=time at which the high or low quality position at epoch n was measured;

t[n]=nT;

dt[n]=t[n]−t[n−1].

Referring still to FIG. 2, if the Correction Terms are substantially available (test condition 44 is satisfied), or if the Correction Terms are computed at step 50, as was disclosed above, the Correction Terms are further used to compute the system quality metrics at the step 58. The system quality metrics allows the upgrade algorithm to make a decision of whether the computed Correction Terms are substantially adequate for upgrading purposes.

More specifically, the system quality metrics taken together, indicate the accuracy of the upgraded signal, wherein the initial signal was of low quality before it was upgraded. Sometimes, it is not the metric itself, but a change in the metric that indicates a degradation in accuracy of the signal that has to be upgraded.

Example XXII

Some Examples of System Quality Metrics (1) Time elapsed since the high quality measurements became unavailable (2) Time elapsed since an update to the Correction Terms was made.

(3) The exact constellation of satellites used for the low quality GPS measurement.

(4) Dilution of Precision (DOP) of the low quality GPS measurement (derived from the constellation).

(5) Number of satellites in the constellation used for the low quality GPS measurement (derived from the constellation).

(6) Number of changes in satellite constellation used for the low quality GPS measurement, since the high quality measurements became unavailable (derived from a history of constellations used).

(7) Number of times the conditions on the metrics, described below, failed and required a re-computation of the Correction Terms.

(8) Changes in the measurements. e.g. the change in position from the prior epoch to the current epoch.

(9) Mismatch between a change in position and the expected change in position based on the measured velocity.

Referring still to FIG. 2, if the test condition 60 is satisfied, that is if the system quality metric indicates that the set of Correction Terms is substantially adequate for upgrading purposes, the next step (step 66) (following the Logical Arrow 64) in the upgrade algorithm is to set a flag indicating that the set of Correction Terms is substantially adequate for upgrading purposes, and to use the set of Correction Terms to upgrade at least one low quality position measurement of the object to obtain at least one upgraded position measurement of the object, and to output at least one upgraded position measurement of the object.

If, on the other hand, the test condition 60 is not satisfied (Logical Arrow 62), that is if the system quality metric indicates that the set of Correction Terms, whether it was available or computed, is substantially inadequate for upgrading purposes, the next step in the upgrade algorithm (step 72) is to set a flag to indicate that the set of Correction Terms is not substantially adequate for upgrading purposes.

Now the issue is whether the set of Correction Terms can be updated to became substantially adequate for upgrading purposes (test condition 76).

The updated Correction Terms can be still inadequate if certain external conditions are satisfied. Please, see U.S. Pat. No. 6,810,324. If this is the case, the updated Correction Terms cannot be used to upgrade the position measurement of the object, and the upgrade algorithm fails.

If, on the other hand, the set of Correction Terms is updatable to become substantially adequate for upgrading purposes, the next step (step 80) of the upgrade algorithm of the present invention is to update the set of Correction Terms, and to use the set of updated Correction Terms to upgrade at least one low quality position measurement of the object in order to obtain at least one upgraded position measurement of the object that is of substantially high quality.

Example XXIII

Examples of Computation of Updates or Recomputations of the Correction Terms

1. Use the speed sensor and steering angle sensor as inputs to the vehicle kinematics model, to predict the position of the vehicle at the measurement epoch of the low quality position.

$$\text{predicted position}[n] = \text{Kinematic Position Model}$$
$$(\text{speed, steering angle}, xl\_\text{upgraded}[n-1], vl\_\text{upgraded}[n-1])$$

$$\text{predicted velocity}[n] = \text{Kinematic Velocity Model}$$
$$(\text{speed, steering angle}, xl\_\text{upgraded}[n-1], vl\_\text{upgraded}[n-1])$$

Then, the Correction Terms are recomputed using the following formula $$bp[n] = xl[n] - \text{predicted position}[n]$$

$$bv[n] = xl[n] - \text{predicted velocity}[n]$$

2. Use inertial sensors—gyros and accelerometers—arranged orthogonally, to predict the position of the vehicle at the measurement epoch of the low quality position.

$$\text{predicted position}[n] = \text{Inertial Position Model}(\text{accelerometer measurements, gyroscope measurements,}$$
$$xl\_\text{upgraded}[n-1], vl\_\text{upgraded}[n-1])$$

$$\text{predicted velocity}[n] = \text{Inertial Velocity Model}(\text{accelerometer measurements, gyroscope measurements,}$$
$$xl\_\text{upgraded}[n-1], vl\_\text{upgraded}[n-1])$$

Then, the Correction Terms are recomputed using the following formula:

$bp[n]=xl[n]$-predicted position$[n]$ $bv[n]=xl[n]$-predicted velocity$[n]$

Referring still to FIG. 2, in one embodiment of the present invention, the upgrade algorithm 40 further comprises the step (not shown) of monitoring errors in the upgraded position measurement of the object. The issue of monitoring errors is closely related to the issue of when the update should be performed.

Example XXIV

Examples of the Use of System Quality Metrics to Determine when an Update to Correction Terms should be Performed 1. Data from GNSS satellites. Monitor changes in the Issue of Data Ephemeris (IODE) parameter from each GPS satellite. A change in IODE indicates that the Correction Terms should be updated at this epoch.

2. Monitor the number of satellites being used in the GPS position solution. If the number of satellites being used in the position solution changes, it may be the proper timing to update the Correction Terms.

Another aspect of the present invention is directed to an apparatus for substituting at least one high quality position measurement of an object taken before an interrupting event with a set of upgraded low quality position measurements of the object provided by the same source of measurements after the interrupting event.

In one embodiment of the present invention, the apparatus comprises (not shown): (A) a means for obtaining at least one high quality position measurement of the object provided by a source of measurements before an interrupting event; (B) a means for saving at least one high quality position measurement of the object; (C) a means for detecting an interrupting event; (D) a means for detecting a restoration event; and (E) a means for upgrading at least one position measurement of the object.

In one embodiment of the present invention, the means (A) for obtaining at least one high quality position measurement of the object further comprises a source of position measurement selected from the group consisting of: {a carrier differential SATPS; a code differential SATPS; an autonomous SATPS; an Inertial Navigation System (INS); and a Pseudolite-Based Positioning System}.

In one embodiment of the present invention, the means (B) for saving at least one high quality position measurement of the object further comprises a memory block (not shown).

In one embodiment of the present invention, the means (C) further comprises a means for detecting the interrupting event selected from the group consisting of: {an event leading to an unacceptable error in the position measurement of the object; and an event causing at least one high quality position measurement of the object to be not substantially recent}.

Figure 3:
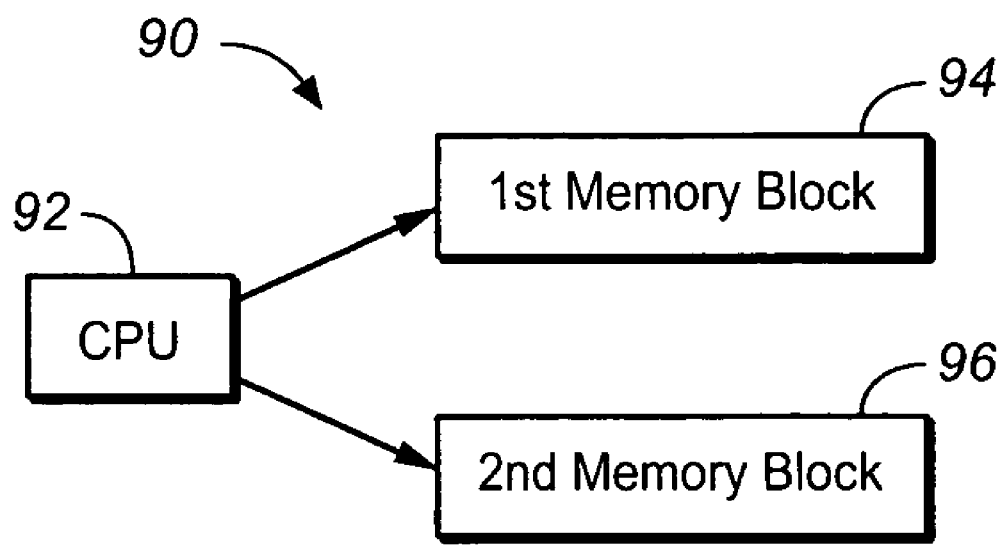
FIG. 3 depicts an apparatus of the present invention for detecting an interrupting event, or for detecting a restoration event, in more detail.

FIG. 3 depicts an apparatus 90 that can be used for detecting an interrupting event in more details. One example of an interrupting event is a change in the satellite tracking list of a GNSS receiver.

More specifically, CPU 92 is configured to compute a satellite tracking list. The computed satellite tracking list is stored in the Second Memory Block 96. The First Memory Block 94 contains the satellite tracking list computed at the previous epoch. The CPU compares the contents of the First Memory Block and the Second Memory Block. If the contents are identical, then the satellite tracking list has not changed from the previous epoch. If the contents are not identical, then the satellite tracking list has changed. This change in the satellite tracking list constitutes an interrupting event, After this comparison is performed, the CPU overwrites the contents of the First Memory Block with the current satellite tracking list, so that the First memory Block can be used in a similar comparison in the next epoch.

Example XXV

Data is from GNSS satellites. Monitor changes in the Issue of Data Ephemeris (IODE) parameter from each GPS satellite. A change in IODE indicates that the Correction Terms should be updated at this epoch.

Monitoring Means include: [memory block 1] containing old IODE; [memory block 2] containing new IODE; and CPU. CPU compares the data in the two memory blocks. If old IODE≠new IODE, cause an update to the Correction Terms.

In one embodiment of the present invention, the means (D) further comprises a means for detecting a restoration event selected from the group consisting of: {an event leading to an acceptable error in the position measurement of the object; and an event causing at least one high quality position measurement of the object to be substantially recent}.

In one embodiment of the present invention, the apparatus 90 can be also used for detecting a restoration event. In this example, the interrupting event was a change in the satellite tracking list. The corresponding restoration event is a change in the satellite tracking list of a GNSS receiver to match the satellite tracking list before the interrupting event.

More specifically, the restoration event can be detected by the following virtual experiment. CPU 92 is configured to compute a satellite tracking list. The computed satellite tracking list is stored in the Second Memory Block 96. The First Memory Block 94 contains the satellite tracking list computed before the interrupting event. The CPU compares the contents of the First Memory Block and the Second Memory Block. If the contents are not identical, then the restoration event has not occurred. If, on the other hand, the contents are identical, then the satellite tracking list has changed to match the satellite tracking list before the interrupting event. This match constitutes a restoration event.

In one embodiment of the present invention, the means (E) for upgrading at least one position measurement of the object further comprises an upgrade algorithm.

In one embodiment of the present invention, the means (E) for upgrading at least one position measurement of the object further comprises an upgrade algorithm comprising at least the following steps: (E1) if a set of Correction Terms is substantially unavailable, computing the set of Correction Terms; wherein the set of Correction Terms comprises a set of error estimates of at least one low quality position measurement; (E2) if the set of Correction Terms is substantially available, computing at least one system quality metric; wherein each the system quality metric indicates whether or not the set of Correction Terms is substantially adequate for upgrading purposes; (E3) if each system quality metric indicates that the set of Correction Terms is substantially adequate for upgrading purposes, setting a flag indicating the set of Correction Terms is substantially adequate for upgrading purposes, using the set of Correction Terms to upgrade at least one low quality position measurement of the object in order to obtain at least one upgraded position measurement of the object, and outputting at least one upgraded position measurement of the object; (E4) if at least one system quality metric indicates that the set of Correction Terms is substantially inadequate for upgrading purposes, setting a flag indicating the set of Correction Terms is substantially inadequate for upgrading purposes, and checking whether the set of Correction Terms can be updated to become substantially adequate for upgrading purposes; (E5) if the set of Correction Terms is updatable to become substantially adequate for upgrading purposes; updating the set of Correction Terms, using the set of updated Correction Terms to upgrade at least one low quality position measurement of the object to obtain at least one upgraded position measurement of the object, and outputting at least one upgraded position measurement of the object; and (E6) preferably repeating the steps ((E1)-(E5)) for each next epoch of position measurement of the object.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for substituting at least one high quality position measurement of an object taken before an interrupting event with a set of upgraded low quality position measurements of said object provided by the same source of measurements after said interrupting event; said method comprising the steps of:
   (A) obtaining at least one high quality position measurement of said object provided by a source of measurements before said interrupting event; said source of measurements before said interrupting event is selected from the group consisting of: {a carrier differential Satellite Positioning System SATPS; a code differential SATPS; an autonomous SATPS; an Inertial Navigation System (INS); and a Pseudolite-Based Positioning System};
   (B) saving said at least one high quality position measurement of said object by using a memory block;
   (C) if said at least one position measurement of said object provided by said source of measurements after said interrupting event is of substantially high quality; or if each said position measurement of said object provided by said source of measurements after said interrupting event is of low quality, and if there is a restoration event, and if at least one said position measurement of said object provided by said source of measurements after said restoration event is of substantially high quality; then using said at least one position measurement of substantially high quality of said object for navigation purposes of said object obtained in said step (A); and
   (D) if each said position measurement of said object provided by said source of measurements after said interrupting event is of low quality, and if there is not at least one restoration event; or, if each said position measurement of said object provided by said source of measurements after said interrupting event is of low quality, and if there is a restoration event, and if each said position measurement of said object provided by said source of measurements after said restoration event is of low quality; then upgrading said at least one position measurement of said object by using an upgrade algorithm; said upgrade algorithm comprising at least the following steps:
   (D1) if a set of Correction Terms is substantially unavailable, computing said set of Correction Terms; wherein said set of Correction Terms comprises a set of error estimates of said at least one low quality position measurement;
   (D2) if said set of Correction Terms is substantially available, computing at least one system quality metric; wherein each said system quality metric indicates whether or not said set of Correction Terms is substantially adequate for upgrading purposes;
   (D3) if each said system quality metric indicates that said set of Correction Terms is substantially adequate for upgrading purposes; setting a flag indicating said set of Correction Terms is substantially adequate for upgrading purposes, using said set of Correction Terms to upgrade said at least one low quality position measurement of said object to obtain said at least one upgraded position measurement of said object and outputting said at least one upgraded position measurement of said object;
   (D4) if at least one said system quality metric indicates that said set of Correction Terms is substantially inadequate for upgrading purposes, setting a flag indicating said set of Correction Terms is substantially inadequate for upgrading purposes, and checking whether said set of Correction Terms can be updated to become substantially adequate for upgrading purposes;
   (D5) if said set of Correction Terms is updatable to become substantially adequate for upgrading purposes; updating said set of Correction Terms, using said set of updated Correction Terms to upgrade said at least one low quality position measurement of said object to obtain said at least one upgraded position measurement of said object, and outputting said at least one upgraded position measurement of said object;
   and
   (D6) repeating said steps ((D1)-(D5)) for each next epoch of position measurement of said object;
   wherein each said low quality position measurement of said object includes an epoch timing coordinate indicative of when said low quality position measurement of said object was taken;
   and wherein said at least one position measurement of said object is of low quality if said low quality position measurement of said object includes an unacceptable error in said position measurement of said object, or is not substantially recent.

2. The method of claim 1, wherein said step (C) further comprises the step of:
   (C1) detecting said interrupting event by using a CPU configured to compute a satellite tracking list; a First Memory Block configured to store a satellite tracking list computed at a prior epoch; and a Second Memory Block configured to store a satellite tracking list computed at a current epoch; wherein said CPU is configured to compare the contents of said First Memory Block and said Second Memory Block; and wherein if these contents are not identical, then said satellite tracking list has changed from said previous epoch and said change in said satellite tracking list constitutes said interrupting event;

wherein said interrupting event is selected from the group consisting of: {an event leading to an unacceptable error in said position measurement of said object; and an event causing said at least one high quality position measurement of said object to be not substantially recent}.

3. The method of claim 1, wherein said step (C) further comprises the step of:
  (C2) detecting said restoration event by using a CPU configured to compute a satellite tracking list; a First Memory Block configured to store a satellite tracking list computed before an interrupting event; and a Second Memory Block configured to store a satellite tracking list computed at a current epoch; wherein said CPU is configured to compare the contents of said First Memory Block and said Second Memory Block; and wherein if these contents are identical, then said satellite tracking list has changed to match said satellite tracking list computed before said interrupting event, and wherein such match constitutes said restoration event;
  wherein said restoration event is selected from the group consisting of: {an event leading to an acceptable error in said position measurement of said object; and an event causing said at least one high quality position measurement of said object to be substantially recent}.

4. A computer-readable storage medium useful in association with a radio navigation chip, said chip having a processor and memory, said chip is configured to substitute at least one high quality position measurement of an object taken before an interrupting event with a set of upgraded low quality position measurements of said object provided by the same source of measurements after said interrupting event; said computer-readable storage medium including computer-readable code instructions configured to cause said processor to execute the steps of an upgrade algorithm comprising at least the following steps:
  (A1) if a set of Correction Terms is substantially unavailable, computing said set of Correction Terms; wherein said set of Correction Terms comprises a set of error estimates of said at least one low quality position measurement;
  (A2) if said set of Correction Terms is substantially available, computing at least one system quality metric; wherein each said system quality metric indicates whether or not said set of Correction Terms is substantially adequate for upgrading purposes;
  (A3) if each said system quality metric indicates that said set of Correction Terms is substantially adequate for upgrading purposes; setting a flag indicating said set of Correction Terms is substantially adequate for upgrading purposes, using said set of Correction Terms to upgrade said at least one low quality position measurement of said object to obtain said at least one upgraded position measurement of said object and outputting said at least one upgraded position measurement of said object; (A4) if at least one said system quality metric indicates that said set of Correction Terms is substantially inadequate for upgrading purposes, setting a flag indicating said set of Correction Terms is substantially inadequate for upgrading purposes, and checking whether said set of Correction Terms can be updated to become substantially adequate for upgrading purposes;
  (A5) if said set of Correction Terms is updatable to become substantially adequate for upgrading purposes; updating said set of Correction Terms, using said set of updated Correction Terms to upgrade said at least one low quality position measurement of said object to obtain said at least one upgraded position measurement of said object, and outputting said at least one upgraded position measurement of said object;
  and
  (A6) repeating said steps ((A1)-(A5)) for each next epoch of position measurement of said object.

5. A computer program product that includes a computer readable medium having a sequence of instructions which, when executed by a processor, causes the processor to execute a process for substitution at least one high quality position measurement of an object taken before an interrupting event with a set of upgraded low quality position measurements of said object provided by the same source of measurements after said interrupting event; the process comprising an upgrade algorithm comprising at least the following steps:
  (A1) if a set of Correction Terms is substantially unavailable, computing said set of Correction Terms; wherein said set of Correction Terms comprises a set of error estimates of said at least one low quality position measurement;
  (A2) if said set of Correction Terms is substantially available, computing at least one system quality metric; wherein each said system quality metric indicates whether or not said set of Correction Terms is substantially adequate for upgrading purposes;
  (A3) if each said system quality metric indicates that said set of Correction Terms is substantially adequate for upgrading purposes; setting a flag indicating said set of Correction Terms is substantially adequate for upgrading purposes, using said set of Correction Terms to upgrade said at least one low quality position measurement of said object to obtain said at least one upgraded position measurement of said object and outputting said at least one upgraded position measurement of said object;
  (A4) if at least one said system quality metric indicates that said set of Correction Terms is substantially inadequate for upgrading purposes, setting a flag indicating said set of Correction Terms is substantially inadequate for upgrading purposes, and checking whether said set of Correction Terms can be updated to become substantially adequate for upgrading purposes;
  (A5) if said set of Correction Terms is updatable to become substantially adequate for upgrading purposes; updating said set of Correction Terms, using said set of updated Correction Terms to upgrade said at least one low quality position measurement of said object to obtain said at least one upgraded position measurement of said object, and outputting said at least one upgraded position measurement of said object;
  and
  (A6) repeating said steps ((A1)-(A5)) for each next epoch of position measurement of said object.

6. An apparatus for substituting at least one high quality position measurement of an object taken before an interrupting event with a set of upgraded low quality position measurements of said object provided by the same source of measurements after said interrupting event; said apparatus comprising:
  (A) a source of position measurement selected from the group consisting of: {a carrier differential Satellite Positioning System SATPS; a code differential SATPS; an autonomous SATPS; an Inertial Navigation System (INS); and a Pseudolite-Based Positioning System};
  (B) a memory block configured to save said at least one high quality position measurement of said object;
  (C) a means for detecting an interrupting event comprising:

a CPU configured to compute a satellite tracking list;

a First Memory Block configured to store a satellite tracking list computed at a prior epoch;

a Second Memory Block configured to store a satellite tracking list computed at a current epoch;

wherein said CPU is configured to compare the contents of said First Memory Block and said Second Memory Block;

and wherein if said contents are not identical, then said satellite tracking list has changed from said previous epoch and said change in said satellite tracking list constitutes said interrupting event;

wherein said interrupting event is selected from the group consisting of: {an event leading to an unacceptable error in said position measurement of said object; and an event causing said at least one high quality position measurement of said object to be not substantially recent};

(D) a means for detecting a restoration event comprising:

a CPU configured to compute a satellite tracking list;

a First Memory Block configured to store a satellite tracking list computed before an interrupting event;

a Second Memory Block configured to store a satellite tracking list computed at a current epoch;

wherein said CPU is configured to compare the contents of said First Memory Block and said Second Memory Block;

and wherein if said contents are identical, then said satellite tracking list has changed to match said satellite tracking list computed before said interrupting event; and wherein such match constitutes said restoration event; and wherein said restoration event is selected from the group consisting of: {an event leading to an acceptable error in said position measurement of said object; and an event causing said at least one high quality position measurement of said object to be substantially recent}; and (E) a means for upgrading said at least one position measurement of said object further comprising:

an upgrade algorithm.

7. The apparatus of claim 6, wherein said upgrade algorithm of means (E) further comprises at least the following steps:

(E1) if a set of Correction Terms is substantially unavailable, computing said set of Correction Terms; wherein said set of Correction Terms comprises a set of error estimates of said at least one low quality position measurement;

(E2) if said set of Correction Terms is substantially available, computing at least one system quality metric; wherein each said system quality metric indicates whether or not said set of Correction Terms is substantially adequate for upgrading purposes;

(E3) if each said system quality metric indicates that said set of Correction Terms is substantially adequate for upgrading purposes; setting a flag indicating said set of Correction Terms is substantially adequate for upgrading purposes, using said set of Correction Terms to upgrade said at least one low quality position measurement of said object to obtain said at least one upgraded position measurement of said object and outputting said at least one upgraded position measurement of said object;

(E4) if at least one said system quality metric indicates that said set of Correction Terms is substantially inadequate for upgrading purposes, setting a flag indicating said set of Correction Terms is substantially inadequate for upgrading purposes, and checking whether said set of Correction Terms can be updated to become substantially adequate for upgrading purposes;

(E5) if said set of Correction Terms is updatable to become substantially adequate for upgrading purposes; updating said set of Correction Terms, using said set of updated Correction Terms to upgrade said at least one low quality position measurement of said object to obtain said at least one upgraded position measurement of said object, and outputting said at least one upgraded position measurement of said object; and (E6) repeating said steps ((E1)-(E5)) for each next epoch of position measurement of said object.

\* \* \* \* \*